(12) United States Patent
Yang

(10) Patent No.: US 7,047,541 B2
(45) Date of Patent: May 16, 2006

(54) IMPACT CUSHION MECHANISM FOR PICK UP HEAD

(75) Inventor: Nomo Yang, Lujou (TW)

(73) Assignee: ASUSTek Computer Inc., Taipei (TW)

( * ) Notice: Subject to any disclaimer, the term of this patent is extended or adjusted under 35 U.S.C. 154(b) by 234 days.

(21) Appl. No.: 10/727,541

(22) Filed: Dec. 5, 2003

(65) Prior Publication Data

US 2004/0111735 A1 Jun. 10, 2004

(30) Foreign Application Priority Data

Dec. 6, 2002 (TW) ............... 91219860 U

(51) Int. Cl.
G11B 17/30 (2006.01)

(52) U.S. Cl. ................................. 720/671

(58) Field of Classification Search ......... 720/671, 720/664

See application file for complete search history.

(56) References Cited

U.S. PATENT DOCUMENTS

| 5,025,371 A | * | 6/1991 | Heinrich | 720/665 |
| 5,119,362 A | * | 6/1992 | Yanagisawa | 720/665 |

FOREIGN PATENT DOCUMENTS

| JP | 2000243046 A | * | 9/2000 |
| JP | 2003249042 A | * | 9/2003 |
| TW | 484131 | | 4/2002 |

* cited by examiner

Primary Examiner—William Korvich
Assistant Examiner—Mark Blouin
(74) Attorney, Agent, or Firm—Rabin & Berdo, PC

(57) ABSTRACT

A impact cushion mechanism for pick up head is installed in an optical disc drive, wherein the optical disc drive is equipped with a pick up head spanning two guide bars whereas one side of the pick up head can move back and forth along the two guide bars. The impact cushion mechanism for pick up head includes two elastic pieces respectively installed at the front and the rear of the connecting device connected with a driving mechanism. When the pick up head moves forward or backward and collides with other objects, a chassis for instance, the impact force can be reduced by means of the elastic piece.

12 Claims, 6 Drawing Sheets

IMPACT CUSHION MECHANISM FOR PICK UP HEAD

This application claims the benefit of Taiwan application Ser. No. 91219860, filed on Dec. 06, 2002.

BACKGROUND OF THE INVENTION

1. Field of the Invention

The invention relates in general to an impact cushion mechanism for an optical pick up head, and more particularly to an impact cushion mechanism for an optical pick up head applied in an optical disc drive.

2. Description of the Related Art

Whenever an ordinary optical disc drive is started, the pick up head will return to the stay-home position through a reciprocate process of colliding with the chassis. Moreover, if the compact disc in use has defects or is of poor quality, the pick up head might misjudge and strike the chassis inward or outward; therefore, the problems and pick up head dislocation and damages of related parts may arise.

FIG. 1 is a top view of a conventional optical disc drive, wherein an optical pick up head 102 can move back and forth along two guide bars by means of an driving mechanism 106. Conventionally, there is no any impact cushion design for the driving mechanism 106, except for a solid plastic 108 being attached to the front and the rear of the driving mechanism 106. When the pick up head 102 strikes the chassis 110 inward or outward, the solid plastic 108 will directly collide with the chassis 110, producing not any practical protection but noises. The schematic illustration in FIG. 2A and FIG. 2B shows respectively the collision status before and after the solid plastic 108 driving mechanism colliding with the chassis 110 of FIG. 1.

Besides, some of the conventional designs install a limit switch i near the inner part of the disc, for limiting the movement of the pick up head via a contact starter. However, without having any particular impact cushion mechanism installed near the outer part of the disc, the pick up head is likely to be damaged due to the striking outward collision.

As disclosed hereinbefore, how to design an impact cushion mechanism appropriately, which can reduce the impact force the pick up head receives, effectively prevent the dislocation of the pick up head, protect the pick up head and related parts from damage and further prolong the life of the optical disc drive, has become a considerable issue to R&D engineers in related fields.

SUMMARY OF THE INVENTION

It is therefore an object of the invention to provide an impact cushion mechanism for pick up head, characterized by installing an elastic object at the front and the rear of an driving mechanism so as to reduce the impact force the pick up head receives during inward and outward collision; thereby protecting the pick up head and related parts thereof from the dislocation or damages.

It is therefore an object of the invention to provide a impact cushion mechanism for an optical pick up head installed in an optical disc drive, wherein the optical disc drive is equipped with a pick up head supported by two guide bars whereas one side of the pick up head can move back and forth along the two guide bars. The impact cushion mechanism for a pick up head includes two elastic objects which are installed at the front and the rear of the driving mechanism respectively. When the pick up head moves forward or backward and collides with other objects, a chassis for instance, the impact force can be reduced by the elastic objects. The elastic object can be a spring, or an elastic piece with different shapes, such as a U-shaped elastic piece. The U-shaped elastic piece can be integrated with the driving mechanism as a whole to provide a better convenience of assembly.

Other objects, features, and advantages of the invention will become apparent from the following detailed description of a preferred but non-limiting embodiment. The following description is made with reference to the accompanying drawings.

DETAILED DESCRIPTION OF THE INVENTION

In the present invention, two elastic pieces are installed at the front and the rear of an driving mechanism respectively, to provide the pick up head a buffer for reducing the impact force whenever the pick up head strikes inward or outward. In the preferred embodiment, an U-shaped elastic piece is taken for illustration in this embodiment.

Figure 1:
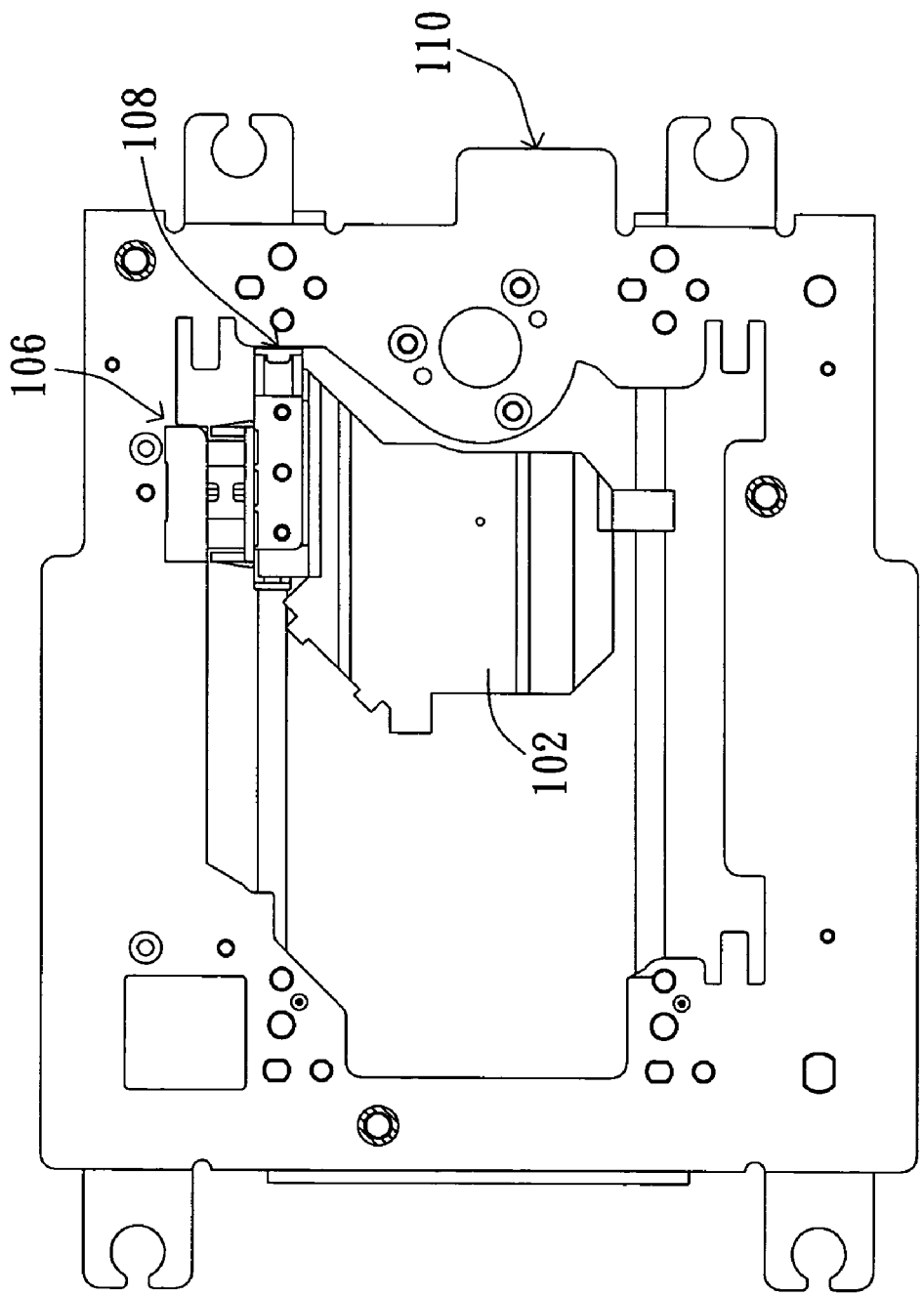
FIG. 1 (prior art) is a top view of a conventional optical disc drive.
Figure 2B:
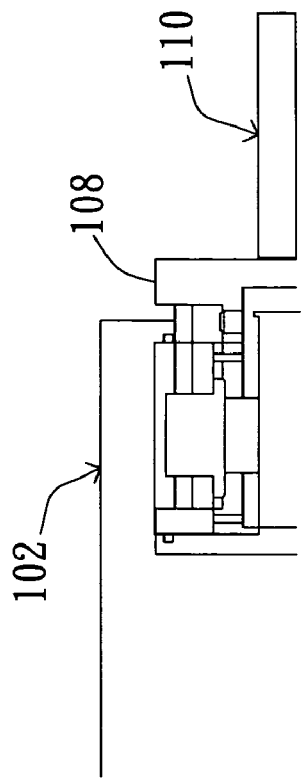
FIG. 2B (prior art) shows a collision status after the driving mechanism colliding with the chassis in FIG. 1.
Figure 2A:
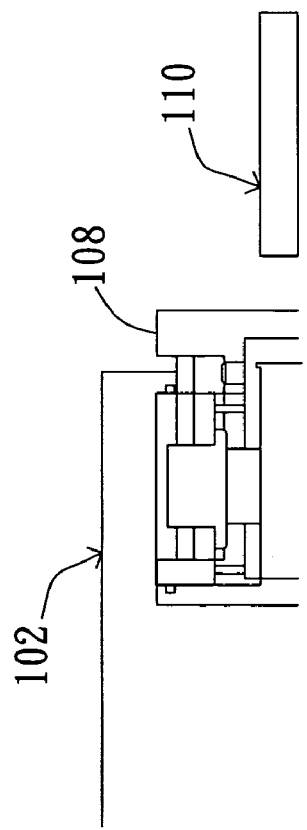
FIG. 2A (prior art) shows a collision status before the driving mechanism colliding with the chassis in FIG. 1.
Figure 3B:
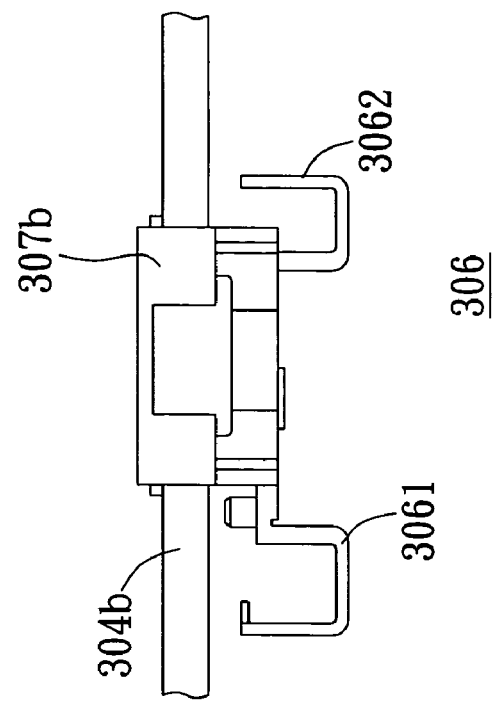
FIG. 3B is a side view of FIG. 3A.
Figure 3A:
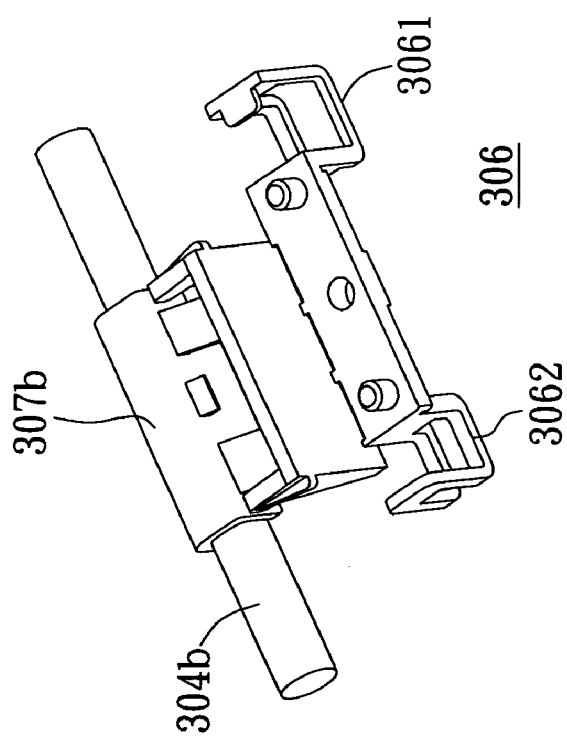
FIG. 3A is a three-dimensional diagram of the driving mechanism according to a preferred embodiment of the invention.

Please refer to FIG. 3A, a three-dimensional diagram of the connecting device according to a preferred embodiment of the invention. Also, please refer to FIG. 3B, a side view of FIG. 3A. There are two U-shaped elastic pieces 3061 and 3062 installed at two sides, such as the front and the rear end, of the connecting device 307b further connected with a driving mechanism 306 respectively serving as a cushion that lessens or absorbs the impact on the pick up head. Moreover, the U-shaped elastic piece can be integrated with the connecting device 307b as a whole giving the advantages of being convenient and time-saving in assembly.

Figure 4A:
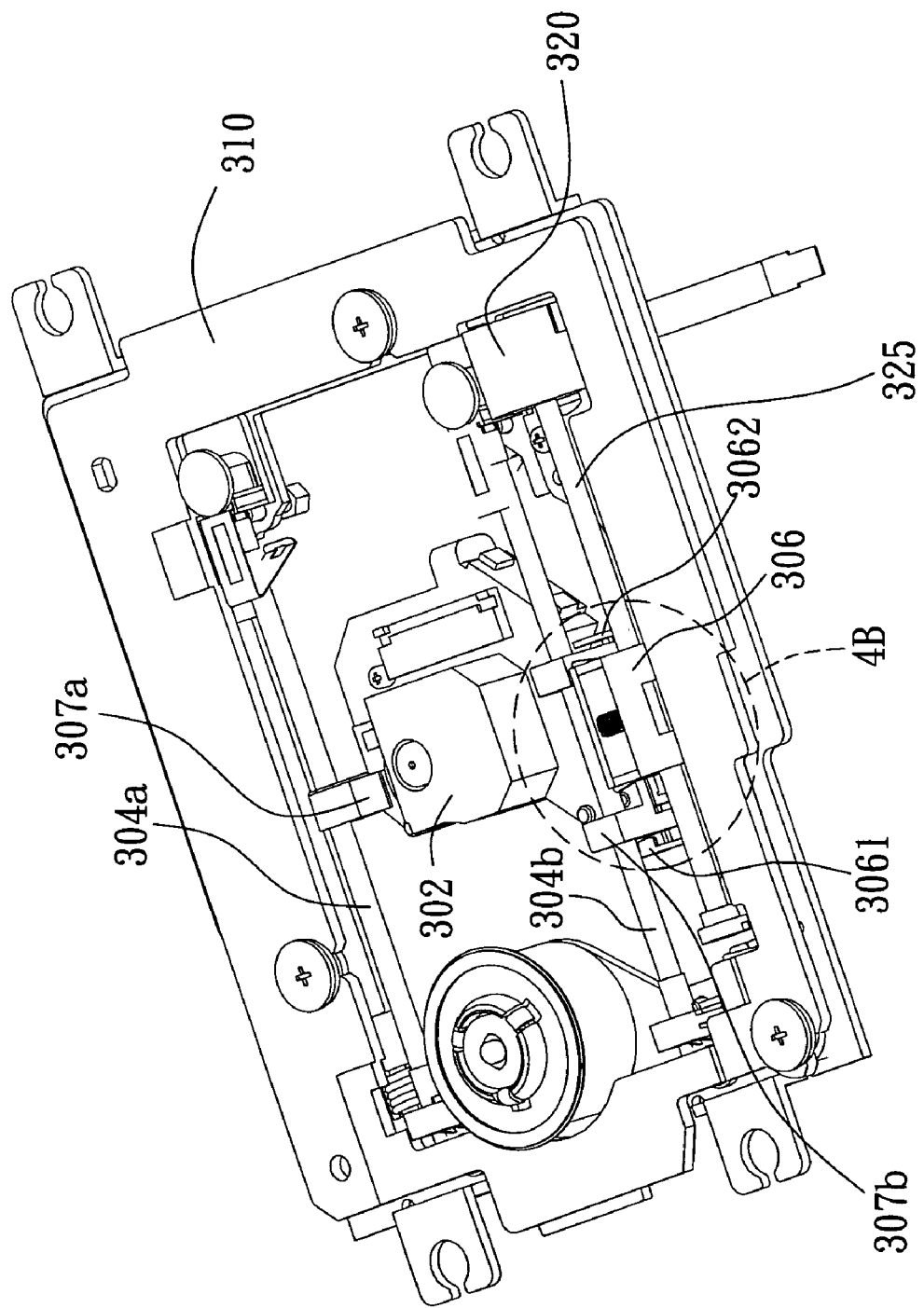
FIG. 4A is a top view of the optical disc drive according to a preferred embodiment of the invention.
Figure 4B:
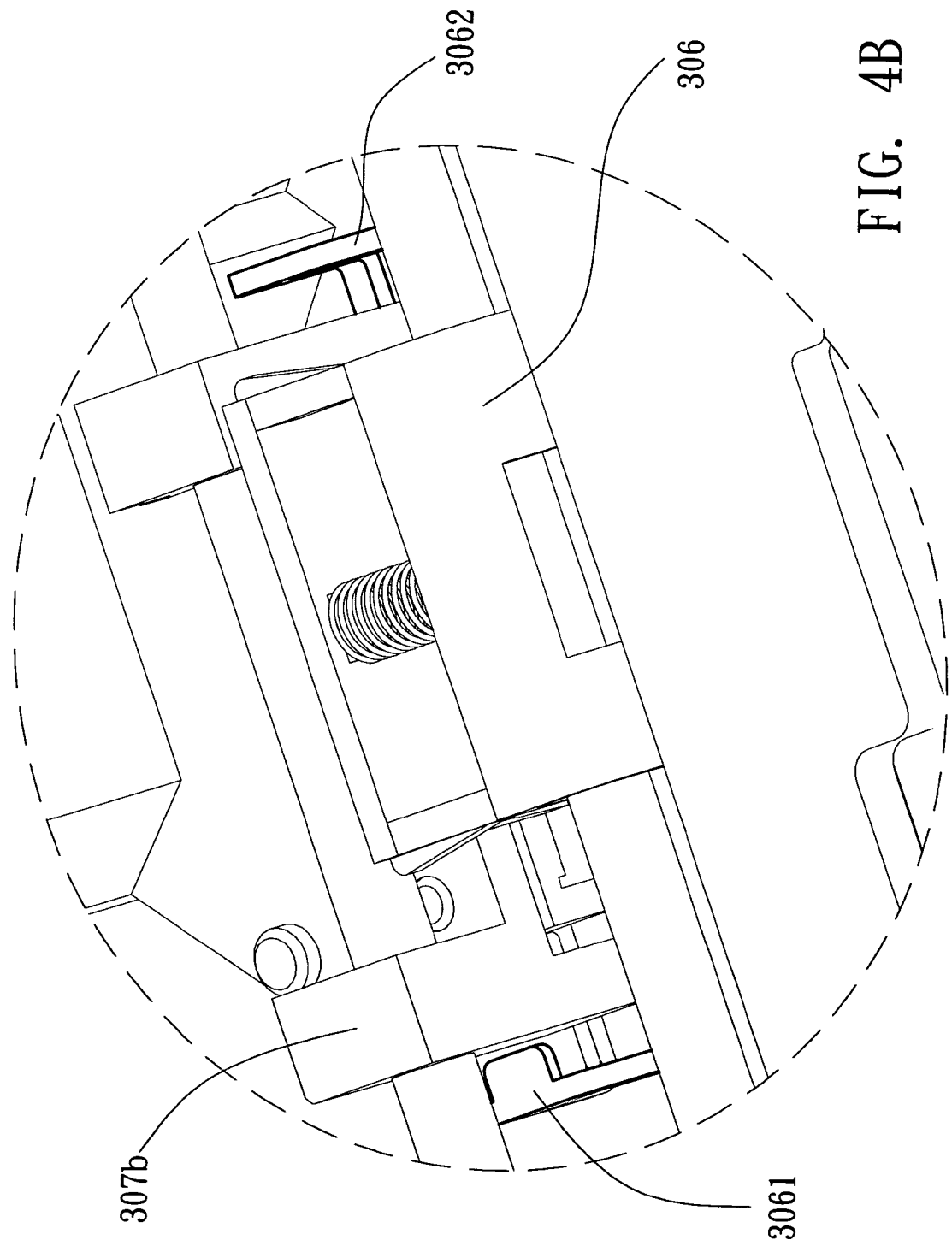
FIG. 4B is a local enlarging drawing of FIG. 4A.

FIG. 4A is a top view of the optical disc drive according to a preferred embodiment of the invention. FIG. 4B is a partially enlarged drawing of FIG. 4A. Referring to both FIG. 4A and FIG. 4B, the optical disc drive is equipped with a chassis 310 on which an optical pick up head 302 is installed. The chassis 310 also has two guide bars 304a and 304b to support the optical pick up head 302 by two connecting devices 307a and 307b, such as racks, thereon. Thereby, the optical pick up head 302 can move both back and forth along the guide bars 304a and 304b by means of the connecting devices 307a and 307b which is further connected with the driving mechanism 306. It can be understood from the relative position of the parts depicted in FIGS. 4A and FIG. 4B that regardless if moving back or forth, the pick up head 302 will first of all be protected by the U-shaped elastic pieces 3061 and 3062, and therefore, the impact force on pick up head 302 will be reduced. Thus, the U-shaped elastic pieces 3061 and 3062 prevent the pick up head 302 from colliding with the components disposed near two ends of the guide bars in the optical disc drive when the pick up head 302 is moving back and forth on the guide bars. In the preferred embodiment, the driving mechanism 306 can advance the pick up head 302 either by engaging with a rack, a gear and a sled motor 320, or by engaging with a threaded rod 325 and a sled motor 320, wherein the gear and the thread are not shown in the abovementioned figures.

Figures 5A, 5B:
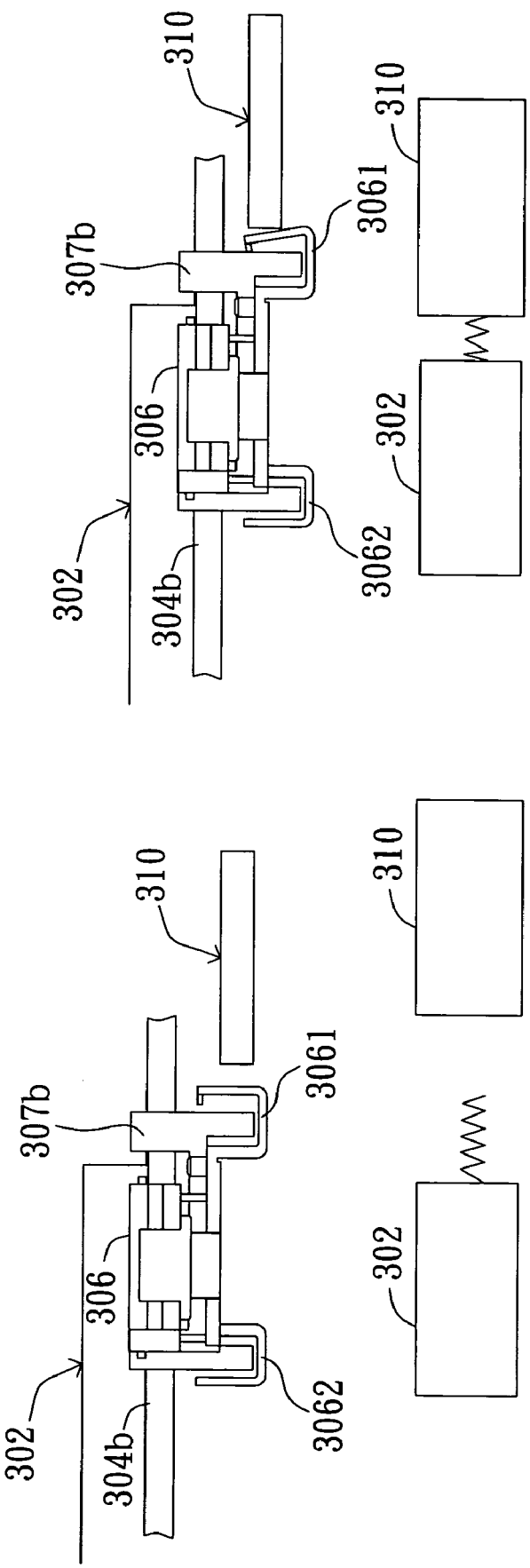
FIG. 5A schematically illustrates the collision status before the driving mechanism colliding with the chassis in FIG. 4A.
FIG. 5B schematically illustrates the collision status after the driving mechanism colliding with the chassis in FIG. 4A.

FIG. 5A and FIG. 5B schematically illustrate the collision status before and after the connecting device 307b colliding with the chassis 310 shown in FIG. 4A, respectively. The U-shaped elastic piece 3061 will bend inward (towards the connecting device 307b) when colliding with the chassis 310, but will return to its original shape and position after being departed from the chassis 310. Therefore, the design of U-shaped elastic pieces 3061 and 3062 in the invention is like a spring or cushion installed in the opposite ends of the optical pick up head 302 for providing a buffer, which reduces not only impact force but also noise when the pick up head 302 collides with the chassis 310.

Although the impact cushion mechanism adopted in the preferred embodiment is made of elastic-plastic and is integrated with the connecting device 307b as a whole for the convenience of assembly, it is noted that the material of the elastic piece of the invention is not limited to the U-shaped elastic piece. Any spring or elastic piece of other materials and shapes with elastic recovering force or able to lessen the collision as a buffer also can be used, in accordance with the spirit of the invention.

The impact cushion mechanism according to the invention installs an elastic piece at the front and the rear of an connecting device, which prevents the pick up head and related parts thereof from being damaged by reducing the impact force and noises while the pick up head strikes inward or outward. The elastic plastics integrated with the connecting device have the advantage of being convenient and time-saving during assembly.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An impact cushion mechanism for use in an optical disc drive, the optical disc drive including an optical pick up head, two guide bars supporting the optical pick up head, a driving mechanism for driving the optical pick up head to move back and forth on the guide bars, and a connecting device connecting the optical pick up head and the driving mechanism, the impact cushion mechanism comprising:

two U-shaped elastic pieces provided at two sides of the connecting device to prevent the optical pick up head from colliding with other components, disposed near two ends of the guide bars, in the optical disc drive when the optical pick up head is moving back and forth on the guide bars.

2. The impact cushion mechanism according to claim 1, wherein the U-shaped elastic piece is a U-shaped spring.

3. The impact cushion mechanism according to claim 1, wherein the U-shaped elastic pieces and the connecting device are integrated as a whole.

4. The impact cushion mechanism according to claim 1, wherein the connecting device is a rack.

5. The impact cushion mechanism head according to claim 1, wherein the driving mechanism comprises a gear and a motor and advances the optical pick up head.

6. The impact cushion mechanism according to claim 1, wherein the driving mechanism comprises a threaded rod and a motor and moves the optical pick up head.

7. An optical disc drive having an impact cushion mechanism, comprising:

an optical pick up head;

two guide bars supporting the optical pick up head;

a driving mechanism for driving the optical pick up head to move back and forth on the guide bar;

a connecting device connecting the optical pick up head and the driving mechanism; and two U-shaped elastic pieces provided at two sides of the connecting device to prevent the optical pick up head from colliding with other components, disposed near two ends of the guide bars, in the optical disc drive when the optical pickup head is moving back and forth on the guide bars.

8. The optical disc drive according to claim 7, further comprising a chassis, wherein an impact force can be reduced by the U-shaped elastic pieces when the connecting device collides with the chassis.

9. The optical disc drive according to claim 7, wherein the U-shaped elastic pieces and the connecting device are integrated as a whole.

10. The optical disc drive according to claim 7, wherein the driving mechanism further comprises a gear and a motor.

11. The optical disc drive according to claim 7, wherein the driving mechanism further comprises a threaded rod and a motor.

12. The optical disc drive according to claim 7, wherein the connecting device is a rack.

* * * * *